Patented Feb. 17, 1931

1,793,143

UNITED STATES PATENT OFFICE

MAXIMILIAN TOCH, OF NEW YORK, N. Y., ASSIGNOR TO STANDARD VARNISH WORKS, OF NEW YORK, N. Y., A CORPORATION OF NEW YORK

PORTLAND-CEMENT-MODIFYING COMPOSITION

No Drawing.     Application filed September 23, 1927.   Serial No. 221,614.

Portland cement has been colored, hardened and otherwise improved by the use, i. e., admixture therewith, of compositions comprising a coloring material, such as red ferric oxid, and a hardening agent, such as calcium chloride. Such compositions, however, heretofore have been supplied to the user in the form of aqueous mixtures or pastes, it having been not feasible to market them in dry form on account of the deliquescence of the calcium chloride.

An object of the present invention is to make it feasible to market such compositions in dry form, and thus to avoid the difficulties and expense incident to packing and shipping the aqueous mixtures in liquid-tight containers.

I have found that mixtures of calcium chloride with other materials, such as pigments, when prepared under suitable dehydrating conditions, for instance by carrying out the mixture in a steam jacketed kettle, will not objectionably deliquesce when freely exposed to the atmosphere within the normal working day, say 8 hours, and that mixtures so prepared when packed in ordinary airtight commercial packages, for instance metal containers with tight-fitting friction covers may be stored for many months without objectionable deliquescence. I have further found that the addition of a colloid material considerably improves the keeping qualities of such calcium chloride-containing compositions. The effect of the colloid material presumably is to take up moisture from the air which comes in contact with the compositions and thus to protect the calcium chloride. It is understood, of course, that my invention is in no wise limited to the foregoing explanation of the effectiveness of the colloid material, and I recognize that the explanation may be quite incorrect.

Compositions in accordance with my invention may comprise a variety of coloring materials, such as, for example bright red ferric oxid, hydrated chromium oxid, mineral black, carbon black, lamp black, manganese dioxid, yellow ferric oxid and para-nitraniline. In general any color which is resistant to alkali may be employed and I prefer to use such colors as tend to increase the tensile strength of the Portland cement.

As colloid material in the compositions, I may use aluminum silicate precipitated in the presence of ammonium tannate, colloidal calcium aluminates, colloidal precipitated barium sulfate, and the like.

In addition to these principal ingredients of the compositions, i. e., the coloring matter, the calcium chloride and the colloidal material, I contemplate the use of other ingredients added for special purposes, such as a small amount of barium chloride, to increase the density of the cement products in which the compositions are used. Barium chloride added to Portland cement presumably reacts with the calcium sulfate normally found in Portland cement forming barium sulfate which fills the pores.

The proportions of the ingredients of the compositions and the quantity of the compositions used to treat a given quantity of Portland cement may vary considerably. For instance, the quantity of coloring matter calculated upon the weight of the cement treated may vary from 15% in the case of para-nitraniline to 2% in the case of some pigments of high coloring power. The colloidal material content of the compositions generally must be at least about 5% to be effective. When barium chloride is used about 5% calculated on the weight of the coloring and hardening mixture is an average figure.

The following example is illustrative:

60 pounds of bright red ferric oxid containing at least 75% $Fe_2O_3$ are mixed with 30 pounds of granulated calcium chloride, 5 pounds of barium chloride, and 5 pounds of aluminum silicate in a steam jacketed kettle at any temperature above 212° F. The mixture is then packed in air tight containers of 10 pounds capacity, each container thus containing sufficient of the composition to treat one 100 pound sack of Portland cement. The composition gives a red cement and serves to waterproof, accelerate, harden, and densify the product.

I claim:

1. A Portland cement modifying composition, being a dry mixture comprising calcium chloride and a colloidally precipitated material.

2. A Portland cement modifying composition, being a dry mixture comprising calcium chloride and a colloidally precipitated inorganic salt.

3. A Portland cement modifying composition, being a dry mixture comprising calcium chloride and a colloidally precipitated silicate.

4. A Portland cement modifying composition, being a dry mixture comprising calcium chloride and colloidally precipitated aluminum silicate.

5. A Portland cement coloring and hardening composition, being a dry mixture comprising a coloring material resistant to Portland cement, calcium chloride and a colloidally precipitated material.

6. A Portland cement coloring and hardening composition, being a dry mixture comprising a pigment resistant to Portland cement, calcium chloride and a colloidally precipitated inorganic salt.

7. A Portland cement coloring and hardening composition, being a dry mixture comprising ferric oxid, calcium chloride and colloidally precipitated aluminum silicate.

8. A Portland cement coloring and hardening composition, being a dry mixture comprising about 60 parts by weight of bright red ferric oxid containing at least 75% of $Fe_2O_3$, about 30 parts by weight of calcium chloride, about 5 parts by weight of colloidal aluminum silicate precipitated in the presence of ammonium tannate, and about 5 parts by weight of barium chloride.

9. A Portland cement modifying composition, being a dry mixture comprising calcium chloride and a colloidal material of the group comprising colloidally precipitated aluminum silicate, colloidally precipitated calcium aluminates and colloidal precipitated barium sulfate.

10. A Portland cement coloring and hardening composition, being a dry mixture comprising a coloring material resistant to Portland cement, calcium chloride and a colloidal material of the group comprising colloidally precipitated aluminum silicate, colloidally precipitated calcium aluminates and colloidal precipitated barium sulfate.

11. A Portland cement modifying composition, being a dry mixture comprising calcium chloride and a colloidally precipitated calcium aluminate.

12. A Portland cement modifying composition, being a dry mixture comprising calcium chloride and colloidally precipitated barium sulfate.

In testimony whereof, I affix my signature.

MAXIMILIAN TOCH.